US008864147B2

(12) United States Patent
Bullis

(10) Patent No.: US 8,864,147 B2
(45) Date of Patent: Oct. 21, 2014

(54) FIELD WORK VEHICLE

(76) Inventor: James K. Bullis, Sunnyvale, CA (US)

(*) Notice: Subject to any disclaimer, the term of this patent is extended or adjusted under 35 U.S.C. 154(b) by 0 days.

(21) Appl. No.: 13/385,924

(22) Filed: Mar. 14, 2012

(65) Prior Publication Data

US 2013/0241162 A1    Sep. 19, 2013

(51) Int. Cl.
*B62D 55/00*    (2006.01)

(52) U.S. Cl.
USPC .......................................... 280/28.5

(58) Field of Classification Search
CPC ........................ B60B 19/00; B62B 2301/256
USPC ..................................... 280/28.5, 32.5, 288.1
See application file for complete search history.

(56) References Cited

U.S. PATENT DOCUMENTS

| | | | |
|---|---|---|---|
| 613,028 A * | 10/1898 | Duvall | 280/202 |
| 716,735 A * | 12/1902 | Mitchell et al. | 280/32.5 |
| 1,210,056 A | 12/1916 | Fairman | |
| 1,376,649 A | 5/1921 | Schneider | |
| 2,560,384 A * | 7/1951 | Crain | 180/251 |
| 2,583,358 A | 1/1952 | Cesan | |
| 3,546,856 A | 12/1970 | Hiyama | |
| 3,589,744 A | 6/1971 | Hansen | |
| 3,614,120 A | 10/1971 | Cicero | |
| 4,250,700 A | 2/1981 | Horn | |
| 4,683,969 A | 8/1987 | Littau | |
| 5,158,319 A | 10/1992 | Norcia | |
| 5,423,166 A | 6/1995 | Scott | |
| 6,565,106 B2 | 5/2003 | Lopez | |
| 6,752,228 B2 | 6/2004 | Aoyama | |
| 7,389,846 B2 * | 6/2008 | Grywacheski et al. | 180/326 |
| 7,543,664 B2 | 6/2009 | Nelson | |
| 7,588,110 B2 * | 9/2009 | Martino | 180/210 |

OTHER PUBLICATIONS

U.S. Appl. No. 13/199,968, filed 2011, Bullis.

* cited by examiner

*Primary Examiner* — Joseph M Rocca
*Assistant Examiner* — Felicia L Brittman

(57) ABSTRACT

Narrow agricultural vehicles have been invented to make farm labor more attractive, to enable enhanced productivity of workers, and to make possible more complete usage of the land.

A low seating position is provided for a worker. The width of the vehicle is approximately the same width as the seated worker, enabling vehicle use with narrowly spaced row crops. The wheel set is configured for both maximum stability and efficient operation on soft surfaces, using large drum wheels that maximize the footprint area.

The vehicle structure includes a wide frame section and a low and narrow tongue structure that connects between front and rear wheel arrangements. The tongue configuration minimizes interference with work of said worker.

1 Claim, 7 Drawing Sheets

FIELD WORK VEHICLE

This patent document contains material that is subject to copyright protection. Facsimile reproduction is allowed of the patent document or the patent disclosure as it appears in the Patent and Trademark Office patent file or records as allowed by US patent law, but otherwise all copyright rights are reserved.

BACKGROUND OF THE INVENTION

1. Field of the Invention

This present invention relates to agricultural vehicles.

2. Description of the Prior Art

There is on-going concern for future agricultural productivity, given the expanding world population. This concern is further exacerbated by the practice of using feed grain crops for making motor vehicle fuel. It is paramount that we make the best possible use of agricultural resources. One way to do this is to greatly expand irrigation by distributing water on a continental basis. This enlargement of agricultural operations could lead to a need for far more agricultural workers. Hopefully, we can find a way to do this within a legal immigration framework. Real progress could be based on a new kind of apparatus that would enhance productivity of workers and make the work into a more attractive activity. The right kind of new vehicles could also make possible a higher use of land, where the commonly allotted space for tractor passage through plantings could be reduced, thus even further improve usage of agricultural resources.

Some kinds of agricultural work are hard, slow, and uncomfortable. It is difficult to find workers and pay them enough to get them to do such tasks. To improve this situation with a machine requires both better productivity and greater comfort of the worker. Productivity has to be better per worker in order to make the cost of the machine affordable. Worker comfort has to be provided to attract worker, but also to enable more effective and sustained performance of tasks. Cost of the machine has to be compatible with expectations for improved productivity. Perhaps of greatest importance is the need for energy efficient operation. The intent is that the wages payable would ultimately increase. Worker safety must be carefully considered in developing new apparatus.

Compared with most generally familiar vehicles, agricultural vehicles of the sort that would significantly assist farm workers have significantly different performance requirements, and some of these offer potential for unique new system solutions. The biggest of these is the fact that for manual work, unusually low speed is desirable. Another key difference is that the low seat that would enable workers to reach to the ground would mean that conventional notions of how to stabilize a vehicle are inapplicable; particularly, a wide wheel base is not needed. Furthermore, the low operator riding position means that stability need not be so absolute since a roll over event would not be particularly hazardous; as we would normally think of such events for farm tractors. A design freedom is the fact that the overall length of a vehicle oriented toward row crop work can be quite large, enabling a vehicle and various ancillary equipment configured in a narrow but long train.

We look at the historical background for apparatus of this sort in the vast field of agricultural vehicles. Not much is found in the way of mechanization to realistically aid hand work in the fields. Rather, the tendency seems to be to develop tractor based solutions or tractor like systems. Tractors make it possible for some kinds of crops to automate the work and to provide very comfortable cab conditions. For some types of crops this leads to very successful operations utilizing ever larger tractors and harvesters of many types. However, the present need seems to call for different approaches. In many situations, the needed work can simply can not be done from a large vehicle because of the need for hand work close to the ground or for workers to be in positions relative to growing crops that would be awkward from large vehicles. Large vehicles are often not desirable because the crops themselves interfere with access by such vehicles, and unfortunately, this can lead to farming methods where crop spacing does not make the best possible use of land resources, simply because land must be reserved to allow for the vehicle to pass.

An example situation where the vehicle prevents crop spacing that would make the best use of land resources is shown in U.S. Pat. No. 3,546,856 Hiyama 1970, FIG. 2. Somewhat better, but still intrusive is the apparatus of U.S. Pat. No. 4,250,700 Horn et al. 1981. A farming system where it is desirable to enable both the worker and vehicle to pass under growing crop vines as illustrated by the U.S. Pat. No. 3,546,856 Hiyama 1970, FIG. 1 and U.S. Pat. No. 5,423,166 Scott 1995, thus showing the disadvantages of vehicles of the size range usually found in farm vehicles. Further, U.S. Pat. No. 5,423,166 Scott 1995 illustrates the intrusiveness of both grape acquisition machinery and the associated trailer by which harvested grapes are collected.

There are prior art vehicle configurations that have been invented with these purposes in mind. U.S. Pat. No. 3,589,744 Hansen 1971 illustrates an apparatus intended to function as an aid to workers. This seems well suited for row crop work. Though the invention U.S. Pat. No. 3,589,744 Hansen 1971 seems to be useful, it is complicated. Conventional wheels with balloon type tires mounted are arranged in a three point stabilizing form, generally like many farm tractors, but also harking back to the three wheeled Morgan roadster of long ago. This is adapted to working on low growing crops with over-arching structure that allows passing over crop rows, but all this leads to complicated equipment, when simplicity is needed to allow inexpensive construction. Still this invention by Hansen is successful in providing a low seat for a worker that enables low crop access, all the way to ground level. Hansen shows one wheel that is relatively large which would help hold down drag when traversing over soft earth, but this of course does not indicate an attempt to use this for stability.

A hard cylindrical wheel concept was disclosed in prior application U.S. Ser. No. 13/199,968 Bullis 2011 in connection with an off road vehicle system intended substantially for agricultural purposes. That invention included a wheel made of thin steel in the form of a hollow cylinder including end caps. Slats were laid on the outer cylinder surface for providing a tread and for strengthening the ground contact surface, and it was noted that these could be rubber coated.

That invention U.S. Ser. No. 13/199,968 Bullis 2011 has the purpose of enabling operation in a narrow row space between row crops where a low seated worker would have ready access to plantings by virtue of a low seat, that seat being adjustable in height as appropriate for the work.

U.S. Pat. No. 2,583,358 Cesan 1952 shows a garden tractor that also relates to these general objectives, though it utilizes conventional pneumatic tired wheels in a conventional four wheel arrangement. Some stability would be achieved due to the weight of the low seated worker, when that is the position of the seat, but the conventional tires would not provide the stability of the hard wheel of Ser. No. 13/199,968 Bullis 2011. Further, the stability that would be achieved under guidance of U.S. Pat. No. 2,583,358 Cesan is particularly called into question by the highly placed machinery, especially the engine shown. It appears that stability issues mean that the design of U.S. Pat. No. 2,583,358 is incapable of operating in the very narrow row space that is possible with U.S. Ser. No. 13/199,968 Bullis 2011. The explicitly stated function of straddling the row of plantings would derive from this limitation, instead of the otherwise operation entirely between rows of plantings.

The individual wheels of that U.S. Pat. No. 2,583,968 Cesan 1952 invention are narrow in width and relatively small in diameter, which means that they would have relatively small ground surface contact and would sink into dirt such that significant loss of energy would occur when moving. U.S. Ser. No. 13/199,968 Bullis 2011 particularly addresses this effect using the wide, large diameter, hard wheel system to spread load over the ground surface.

Continuous track vehicles serve to enable operation on soft dirt. A wide variation of such a track would offer lateral stability to prevent roll over, should it be used for that purpose, and the included wheels with the track could provide a wide wheel base if needed. The wide range of use of tracked vehicles in agriculture is represented by U.S. Pat. No. 1,376,649 Schneider 1921 and U.S. Pat. No. 4,683,969 Littau 1987. U.S. Pat. No. 7,543,664 Nelson 2009 shows a rubber version, and though this is not indicated, this could be adapted to provide stability as well as load spreading benefits. Generally, vehicles using tracked wheel systems arrange for the tracks to act in widely spaced pairs to provide stability. Rubber forms of tracked systems are used in snow-mobiles, where the single track contributes somewhat to vehicle stabilization.

Comparing again to U.S. Pat. No. 3,589,744 Hansen 1971, a simpler vehicle would be the recumbent bicycle as illustrated with a sidecar in U.S. Pat. No. 6,565,106 Lopez 2003. With or without a motor or engine this at least shows the basic simplicity needed. A tricycle form of this recumbent bicycle is an obvious variation that can be occasionally seen in use, but this would be still quite useless for the present purpose given that these wheels, though large in diameter, are narrow such that they would sink in soft dirt and cause much resistance to vehicle movement. The obvious tricycle form often includes wide, laterally spaced wheel sets; significantly wider than what would be desired for carrying a worker between narrowly spaced rows.

A very simple aid to workers would be the wheeled stool of U.S. Pat. No. 3,614,120 Cicero 1971 where a seat is provided with a seat back at a slanted position that would make low work more comfortable. This invention shows wide wheels but these are shown as they are mostly for convenience, as they are indicated to be typical rubber balloon tires. Stability for this "Chair Cycle" depends on the use of the legs and feet of the worker, not a lot differently from the way one legged milk stools were stabilized by the user. Though perhaps this is a useful apparatus, it can not be considered in the category of significant mechanization.

The impediment to progress of the widely used rubber, balloon, tractor tire such is indicated in U.S. Pat. No. 3,589,744 Hansen 1971. This works fine where there is a pair of widely spaced wheels that achieves stability, but by itself offers little resistance to rolling sidewise. But wide spacing is exactly what we are not looking for, in order to accomplish the present purposes for enabling more effective crop work.

Curiously, tractor tires of the 1920s utilized hard steel wheels with large spikes bolted to them, where these spikes were called lugs. Because the typical farmer used regular roadways to get tractors from field to field, these lugs caused much disruption of smooth road surfaces. All this went away with inflated rubber tires of the mentioned balloon type. Lugs might not matter to stability, and they could be advantageous in a low speed vehicle.

Searching for solid wheels that would improve stability with a narrow wheelbase turned up U.S. Pat. No. 1,210,056 Fairman 1916 where a narrow vehicle is fitted with hard wheels. This vehicle is questionable as to safety given the high seat position, and of course this configuration does not suggest any interest in enabling hand work on low crops. A tractor utilizing hard wheels configured of lateral slats overlaid with slanted gripping ridges is shown in U.S. Pat. No. 2,560,384 Crain 1951. Though far from the field of farm vehicles, a relevant solid drum wheel is shown in the baby carriage for use in soft dirt of U.S. Pat. No. 5,158,319 Norcia et al. 1992, though there is no low seat for farm work and no special stabilizing purpose involved other than that of conventional baby carriage wheels.

U.S. Pat. No. 6,752,228 Aoyama 2004 reminds us of a function of agricultural vehicles depending on existence of tow bar capabilities, but it also illustrates the difficulty that is encountered in making the seat position truly low. This particular invention is announced as one that enables a low profile operation.

The previously mentioned invention U.S. Pat. No. 2,583,358 Cesan 1952 is pertinent in that it is a form that enables work by a low seated worker. It is configured to enable the vehicle to straddle a row of plantings such that a worker could reach down between low, side rails and tend such plantings. Though U.S. Pat. No. 2,583,358 Cesan enables access directly in front and below the worker, the side rails that would interfere with work to the side at low heights.

FIG. 1 (prior art) shows the side structure of the previously invented vehicle U.S. Ser. No. 13/199/968 Bullis 2011. This vehicles is well suited for use in row crop work on a field 102 tending planted rows 103. The narrow vehicle 101 is configured to be narrow in width 110 to fit in a single row space 105 between two rows of plantings 104, driving in forward direction indicated 109. This particularly long 122 vehicle is designed in recognition of the generally long available space of a large field, thus the equipment is distributed over length rather than width as with typical vehicles. Though light weight is possible with a box-like general structure, the side panels and upper rails limit access to field crops. Access to plants at the ground level is troublesome due to both the floor and side structure of this vehicle.

SUMMARY OF THE INVENTION

The present invention relates particularly to the previous invention of U.S. Ser. No. 13/199,968 Bullis 2011, which is incorporated here by reference.

The vehicle is narrow such that it fits in a single row space and enables a worker to sit generally facing forward such that there is access to crops on each side. The seat is capable of being in a very low position whereby the worker can reach to near ground level. The overall vehicle is approximately the same width as the seated worker. Stabilization is provided by a front and a rear wheel set that is configured to give a stable vehicle stance, even though it is exceptionally narrow.

It was found that a low, thin, and narrow tongue structure suffices as a connection between front and rear wheel structures. The seat provided enables the worker to sit just above the tongue. The main function of the tongue is to lead the rear wheel somewhat like the function of the tongue of a common small trailer towed by an automobile. The tongue structure has a lesser function of carrying loads. Thus, it is possible to achieve adequate mechanical integrity without framing at the side of the vehicle.

Though the vehicle is exceptionally narrow, the tongue is still narrower such that the worker could stand in the narrow row space next to the tongue and still be with in the row space. From a seated position, he could reach into a row of plants from a very low side position, even though the vehicle was positioned immediately next to the plants.

Unlike an unstable situation that would result with pneumatic tires, the present vehicle utilizes hard edges of a large rigid wheel to achieve stability, along with a generally low vehicle profile and a low speed dynamic situation. Center of gravity is controlled such that it is generally lower than the axle of the large wheel.

This wheel also provides a large footprint ground contact due to both a wide flat lateral surface and extended in line contact, whereby energy efficiency is enhanced.

DETAILED DESCRIPTION

The background art clearly shows limited extension of industrial technology to the agricultural world to provide what could be important changes in agricultural practice. Thus that practice carries on inadequately, seemingly unaware that industrial approaches could minimize the difficulty and discomfort of the work, not to mention what such approaches could do to enhance productivity of both workers and land. Surprisingly, it appears that it is possible to make agriculture significantly more profitable.

Figure 1:
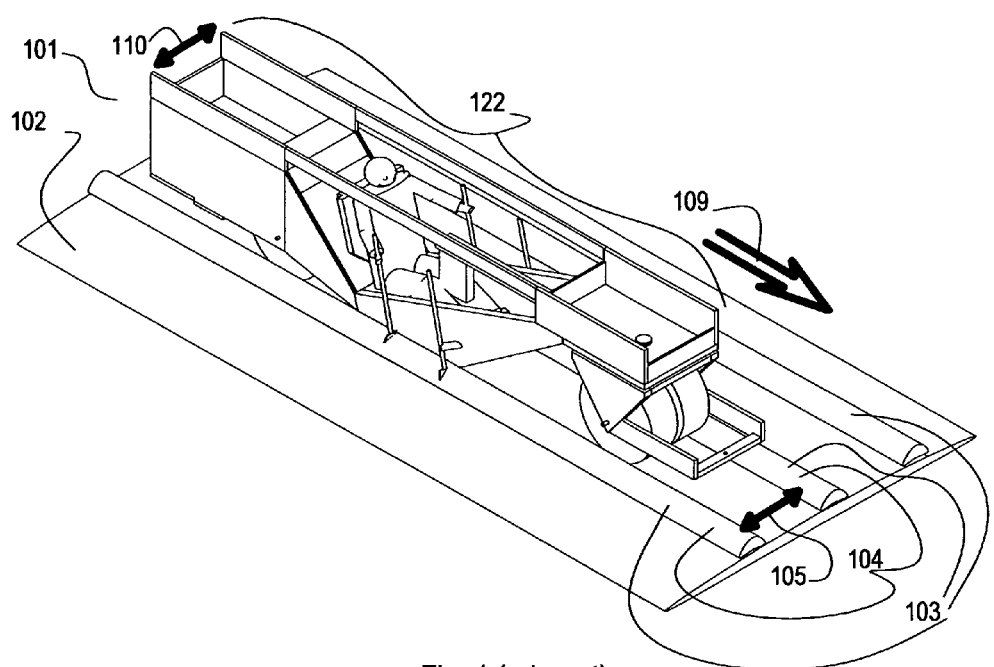
FIG. 1 Agricultural vehicle working in field of row crops (prior art)
Figure 2:
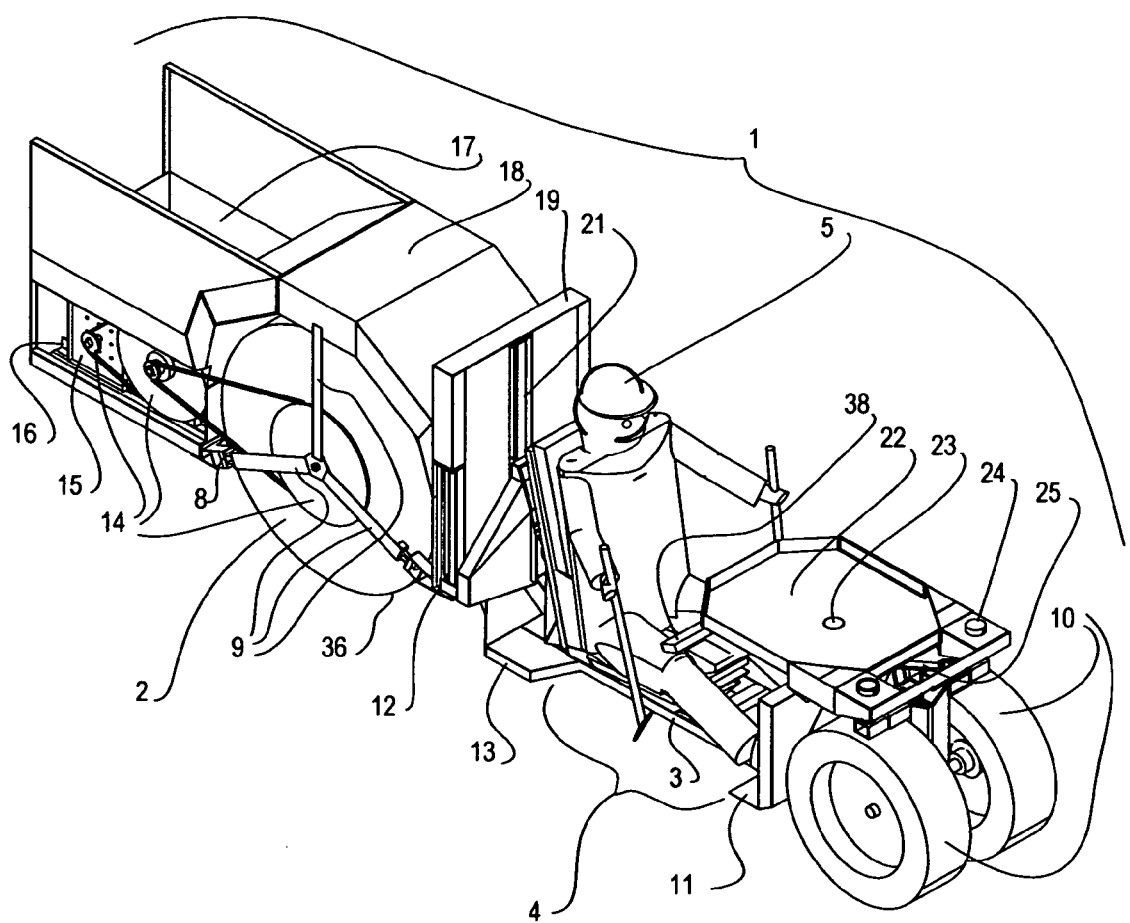
FIG. 2 Agricultural vehicle with low and narrow tongue tying front and rear wheel systems FIG. 3 Plan view of invention to show narrow, but long, form of concept and access advantage FIG. 4 Side view to show low profile of concept to show tongue function and requirements for structural strength FIG. 5 View with rear structure mostly removed to enable clear perception of tongue feature FIG. 6 View of tongue structure with moveable flaps attached for safety FIG. 7 Flap details with flap in lowered position.

FIG. 1 (prior art) shows an initial concept vehicle for operating in a single row space and enabling much improved access to crops and much improved working conditions. FIG. 2 illustrates the present invention having similar purposes, but being superior due to more advanced implementation.

The here invented vehicle 1 utilizes a wide rigid wheel system 2 that provides maximum stability and causes a minimum of energy loss due to earth depression. Front 10 and rear wheel 2 wheel systems are connected by a low and narrow tongue structure 3 over which is generally seated a worker represented by place holder 5. The tongue 3 is shaped to enable an approach 4 to low plant and ground levels. The ground access 4 is shaped even to enable a worker to stand on the ground in the row space next to the vehicle 1 though full and proper utilization of this space involves further apparatus to be shown later. A worker could also stand on the tongue 3. Structure interfacing of the tongue 3 with the rear frame includes a brace 13 which is useful for imparting turning force to the wide rear wheel system 2. Turning force on the rear wheel 2 is not insignificant due to its solid and wide surface contact and significant concentration of vehicle weight on this rear wheel 2 through the use of the arch structure 18 and weight bearing strap system 9.

Vehicle parts include a direction controlling wheel set 10 that is minimally loaded, where closely spaced wheels provide some spreading of that modest load over the ground surface. These can be rubber or hard cylinders, and though hard cylinders are preferred for stability practicality suggests use of readily available rubber tires. Front wheels are mounted on pivoting apparatus that provides a vertical pivot axis for each, and in this configuration, this axis is positioned to minimize forces that could cause steering annoyances. The knee controlled tiller 38 operates through tiller pivot bearing 23 to control these pivot mounted 24 front wheels through control rods 25. This control functions under the work tray 22 provided for worker use.

Further details include a foot rest 11, seat positioning rollers (available as 'heavy duty skate wheels' from McMaster-Carr industrial supply) on the side 12 and center 21 which enable change of seat height, these operating on rails mounted on wall 12 which is attached to the arch structure 18. A truck space is provided 17 with battery space underneath such that batteries are carried on the lowest level of the rear of the vehicle. Trailer attachment 16 is indicated An access panel is off to show how drive force is generated with the DC electric motor 15 (Mars P/N ME0709) which drives a chain and sprocket (also from McMaster Carr as standard roller chain and sprockets) gearing system 14 which drives the large wheel 2. The motor control is by simple incremental electrical switching, though continuous variable speed control is known in the industry. The large wheel 2 is specially formed to provide the benefits of a large wheel without the usual weight of such. Thus, it is a drum formed of sheet metal, provided with bearings and held with straps 9 that carry weight but do little to keep the wheel 2 from moving laterally. However, lateral stabilizing roller 8 and its opposite side counterpart are placed as shown to keep proper alignment of this light weight drum system. Safety side panels would enclose the wheel and chain drive equipment, though such panels are removed here for clarity.

A sun shade panel is not shown, but is an obvious part of a system that is intended to make farm work attractive.

The previous invention, U.S. Ser. No. 13/199,968 Bullis 2011, disclosed slats that have a rubber surface being attached to the drum to provide strength at the surface and a slightly soft ground contract surface. Track pads from the heavy track vehicle industry are being utilized as the slats 36; these having been acquired from McLaren Industries, as part Hybrid Rubber Shoes 350 MM. The fact of generally low center of gravity, low operating speed makes it possible that the wide and firm drum wheel system 2 provides the needed stability. And of course, the large area footprint of such a wheel system 2 means the whole vehicle will operate much more efficiently than vehicles with wheels having a smaller footprint.

It is encouraging to observe the light weight structures being produced with the use of triangular and trapezoidal panel shapes made of 16 gauge sheet metal, with 11 gauge sheet metal at points of stress concentration. This construction has demonstrated the validity of the small tongue connecting structure as shown. Thus, the wall 19 structure, the arch 18 structure and the rear compartments are configured to transfer the more significant loads to the large wheel 2 axle, while meeting a light weight objective. Low cost production is anticipated based on this development work.

Figure 3:
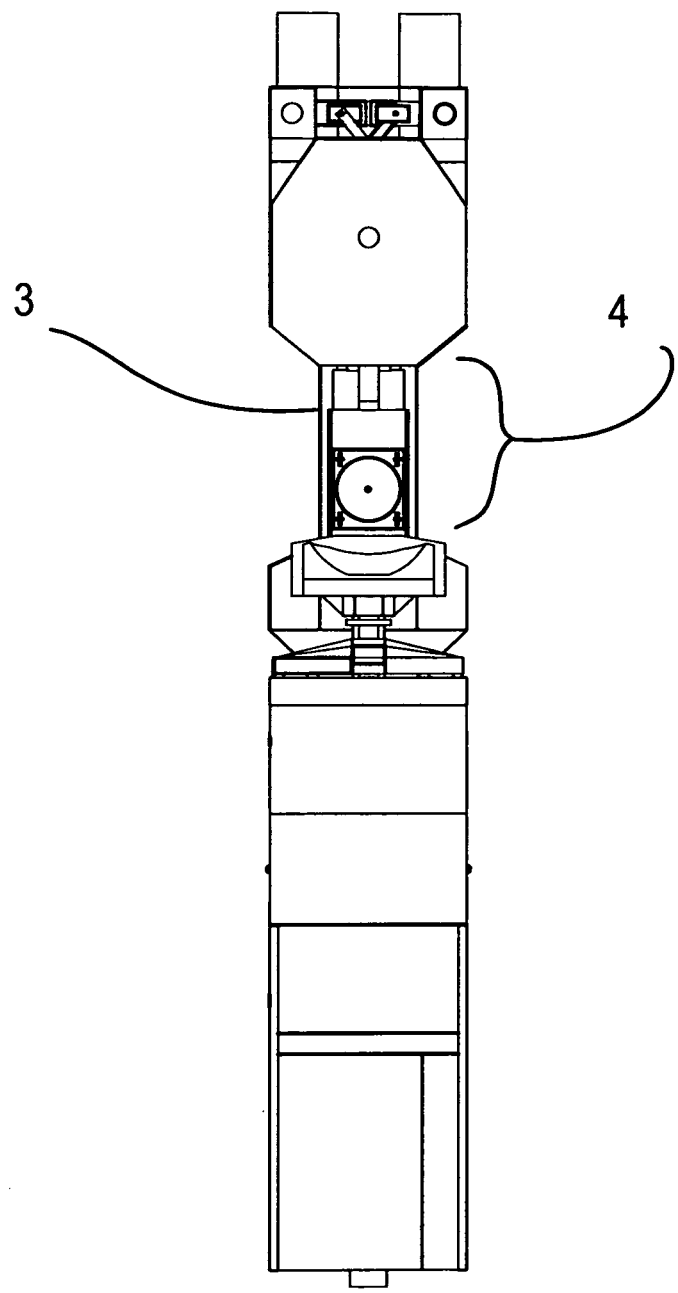

FIG. 3 clarifies the much improved access 4 to crops due to the present invention, where the narrow tongue 3 exposes more of the ground next to plants and opens a path to the base of plants that does not require tool insertion through actually growing plants.

Figure 4:
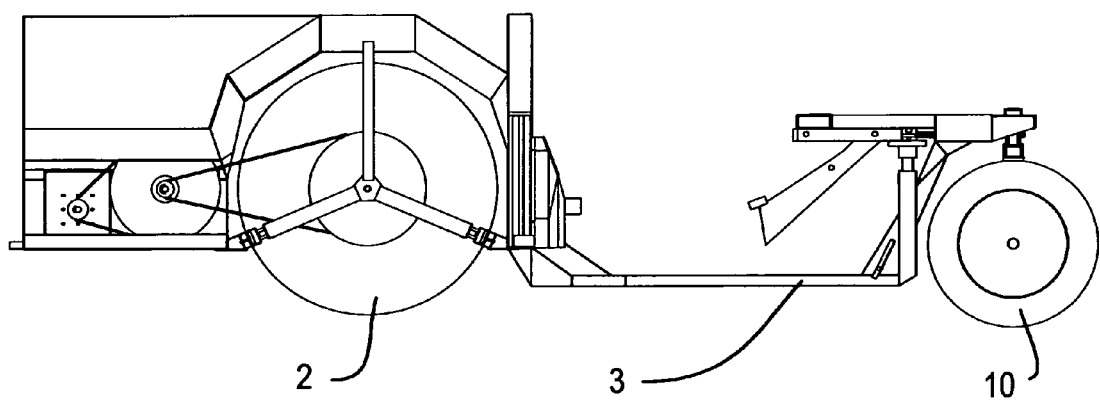

FIG. 4 illustrates the particularly thin tongue structure 3. The present invention involved the realization that light weight expected of a more box like structure was not so important in overall weight, and nearly the same overall weight could be still achieved when that box like frame was eliminated in favor of the described tongue connection. Because there is relatively little strength required of the mid frame, it makes not much difference that the tongue arrangement that is generally less strong than a box like frame.

It is clear from the view of FIG. 4 that the vehicle is configured to have a very low center of gravity, that center of gravity being lower even than the rear wheel axle, especially when it is noted as pointed out in FIG. 2 that batteries are carried under the truck bed 17.

Figure 5:
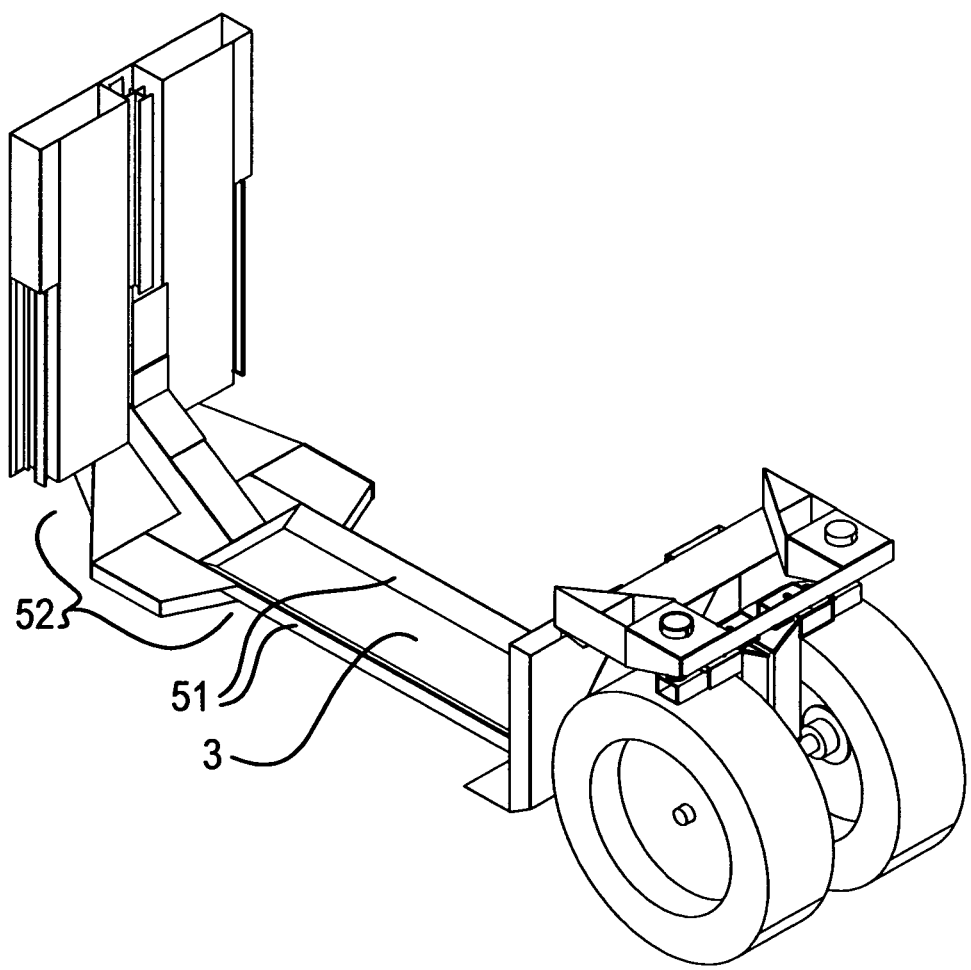

FIG. 5 shows the tongue structure 3 including stiffening edges 51 and transition 52 of wider rear structure to the narrow tongue structure 3.

Figure 6:
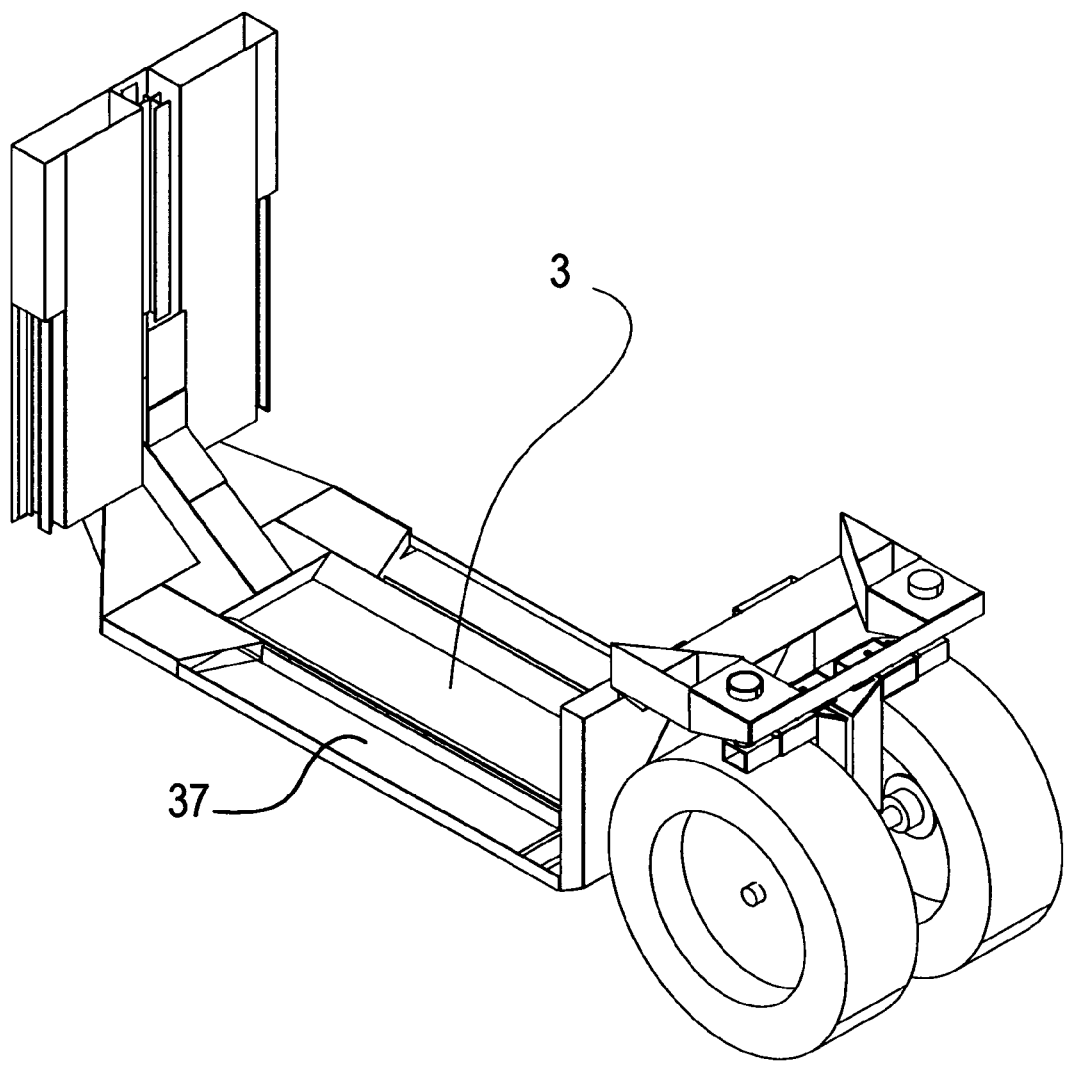
Figure 7:
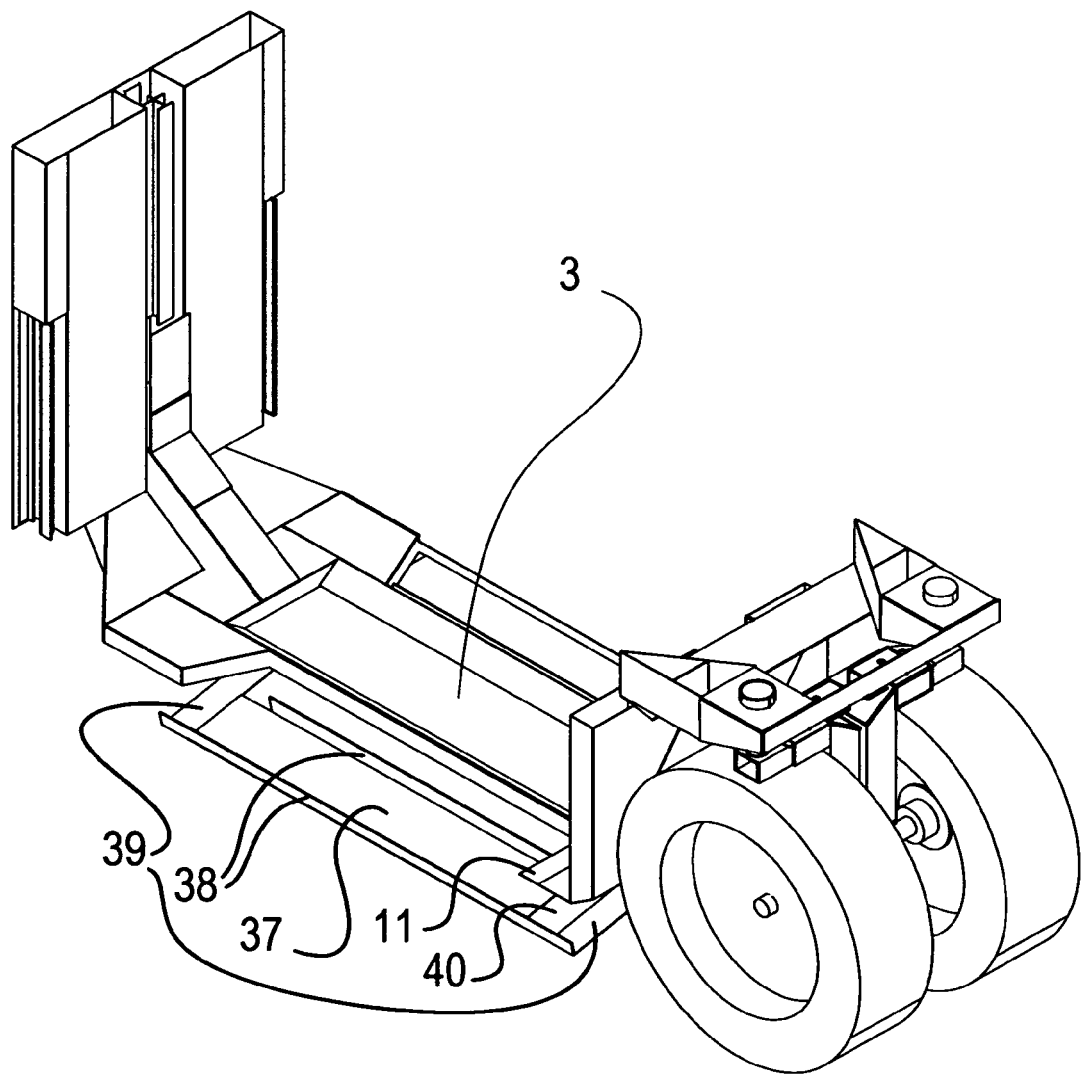

FIG. 6 shows the addition of flaps 37 to said tongue structure 3 in a raised position. FIG. 7 indicates flap details which can be seen with flaps 37 in lowered position. These details are pointed out for a right side flap. They include raised edges of flap 38 and spring controlled attachments 39 that serve to hold flap up unless deliberate force is imposed by the worker by his pushing down on it with his foot. Open space 40 is indicated where flap surface does not extend under foot rest 11. Open space 40 is due to the fact that right and left attachments do a form of pass by of each other since hinging of each flap is generally functioning on the far opposite side of the vehicle for respective flaps. This keeps the flaps as nearly flat to the ground, when in lowered position.

For prototype implementation of machinery functions, extensive use has been made of inexpensive spindles and hubs from the highway trailer vehicle world. This minimized cost while incurring a minor penalty of minimizing weight. There are, of course, many variations of the here described invention that one familiar with machine design would readily utilize, and one would expect production methods to be quite different from those described here.

The use of an electric motor and batteries is particularly attractive, though addition of an auxiliary engine is anticipated in many cases, and even a fully mechanical drive system has its uses in some applications.

The scope of the invention is to be defined by the appended claims.

I claim:

1. A narrow vehicle for agricultural work that includes a frame with an attached set of wheels and an attached seat for a farm worker, where said seat enables said worker to ride within reach of crops and low to the ground as appropriate for said work, where said set of wheels includes a wide wheel set having a width that is approximately that of said narrow vehicle, and where said wide wheel set is a wide drum that is solid and hard such that it provides stabilization according to the width to its outer edges, where said stabilization acts to prevent roll over of said narrow vehicle, and where said frame includes a central structural part that is a low placed tongue structure that connects between front and rear parts of said narrow vehicle, said tongue structure being significantly narrower than said narrow vehicle, where the center of gravity of said narrow vehicle, when unloaded, is lower than the center of the wide wheel set.

* * * * *